United States Patent
Seo et al.

(10) Patent No.: US 10,924,319 B2
(45) Date of Patent: Feb. 16, 2021

(54) METHOD FOR TRANSMITTING OR RECEIVING DOWNLINK SIGNAL IN WIRELESS COMMUNICATION SYSTEM, AND APPARATUS THEREFOR

(71) Applicant: LG ELECTRONICS INC., Seoul (KR)

(72) Inventors: Inkwon Seo, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 16/339,893

(22) PCT Filed: Sep. 29, 2017

(86) PCT No.: PCT/KR2017/010949
§ 371 (c)(1),
(2) Date: Apr. 5, 2019

(87) PCT Pub. No.: WO2018/066924
PCT Pub. Date: Apr. 12, 2018

(65) Prior Publication Data
US 2019/0273648 A1  Sep. 5, 2019

Related U.S. Application Data

(60) Provisional application No. 62/405,226, filed on Oct. 6, 2016.

(51) Int. Cl.
*H04L 27/36* (2006.01)
*H04W 72/12* (2009.01)
(Continued)

(52) U.S. Cl.
CPC .............. *H04L 27/36* (2013.01); *H04L 5/00* (2013.01); *H04L 27/34* (2013.01);
(Continued)

(58) Field of Classification Search
CPC . H04L 27/36; H04L 5/00; H04L 27/34; H04L 27/2627; H04L 5/0016; H04W 72/1289; H04J 11/004
See application file for complete search history.

(56) References Cited

U.S. PATENT DOCUMENTS 9,866,364 B2 *  1/2018  Jia ............................ H04L 5/02
10,003,486 B2 *  6/2018  Zhu ..................... H04L 27/2627
(Continued)

FOREIGN PATENT DOCUMENTS

WO    WO2016144100    9/2016

OTHER PUBLICATIONS

PCT International Search Report and Written Opinion in International Application No. PCT/KR2017/010949, dated Jan. 25, 2018, 19 pages (with English translation).

*Primary Examiner* — Brian T O Connor
(74) *Attorney, Agent, or Firm* — Fish & Richardson P.C.

(57) ABSTRACT

The method, according to one embodiment of the present invention, by which in a wireless communication system a base station transmits signals to a plurality of terminals on the basis of non-orthogonal multiple access (NOMA), comprises the steps of: mapping first information bits for a first terminal and second information bits for a second terminal onto a first layer for the NOMA; modulating the first information bits and the second information bits which have been mapped on the first layer; and transmitting modulation symbols, which have been generated as a result of the modulation, to the first terminal and the second terminal, wherein the base station may map the first information bits and the second information bits onto the first layer, at a bit level before the modulation symbols have been generated.

12 Claims, 15 Drawing Sheets

(51) Int. Cl.
  *H04L 5/00*    (2006.01)
  *H04L 27/34*   (2006.01)
  *H04J 11/00*   (2006.01)
  *H04L 27/26*   (2006.01)

(52) U.S. Cl.
  CPC ........ *H04W 72/1289* (2013.01); *H04J 11/004* (2013.01); *H04L 27/2627* (2013.01)

(56) References Cited

U.S. PATENT DOCUMENTS

| | | |
|---|---|---|
| 10,211,952 B2 * | 2/2019  | Jang ...................... H04L 1/0057 |
| 2015/0312074 A1 | 10/2015 | Zhu et al. |
| 2016/0100413 A1 | 4/2016  | Hwang et al. |
| 2016/0191175 A1 | 6/2016  | Hwang et al. |
| 2016/0204969 A1 | 7/2016  | Zhu et al. |
| 2018/0077687 A1* | 3/2018 | Yoshimura .......... H04L 27/3488 |
| 2018/0262288 A1* | 9/2018 | Gao ...................... H04J 11/004 |

* cited by examiner

METHOD FOR TRANSMITTING OR RECEIVING DOWNLINK SIGNAL IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/010949, filed on Sep. 29, 2017, which claims the benefit of U.S. Provisional Application No. 62/405,226, filed on Oct. 6, 2016. The disclosures of the prior applications are incorporated by reference in their entirety.

TECHNICAL FIELD

The present disclosure relates to a wireless communication system, and more particularly, to a method of transmitting or receiving a downlink signal using a non-orthogonal multiple access scheme and apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE OF THE INVENTION

Technical Task

The object of the present disclosure is to provide a method of transmitting or receiving a downlink signal by performing Non-Orthogonal Multiple Access (NOMA) on a layer basis in a wireless communication system supporting NOMA and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting a signal to multiple User Equipments (UEs) based on Non-Orthogonal Multiple Access (NOMA) by a base station in a wireless communication system. The method may include: mapping first information bits for a first UE and second information bits for a second UE onto a first layer for NOMA; modulating the first and second information bits mapped onto the first layer; and transmitting modulation symbols generated based on the modulation to the first and second UEs. In this case, the base station may be configured to map the first and second information bits onto the first layer at a bit level before generating the modulation symbols.

In another aspect of the present disclosure, provided is a base station for transmitting a signal to multiple User Equipments (UEs) based on Non-Orthogonal Multiple Access (NOMA) in a wireless communication system. The base station may include: a processor configured to map first information bits for a first UE and second information bits for a second UE onto a first layer for NOMA and modulate the first and second information bits mapped onto the first layer; and a transmitter configured to transmit modulation symbols generated based on the modulation to the first and second UEs under control of the processor. In addition, the processor may be configured to map the first and second information bits onto the first layer at a bit level before generating the modulation symbols.

The base station may be configured to map third information bits for the first UE onto a second layer, and the second layer may be for NOMA between the first UE and a third UE rather than the second UE or Orthogonal Multiple Access (OMA).

The base station may be configured to determine the first information bits to be mapped onto the first layer and the third information bits to be mapped onto the second layer from a bit sequence for the first UE based on considering a modulation order.

A part of a bit sequence indicated by each of the modulation symbols may relate to the first information bits for the first UE, and the remaining part thereof may relate to the second information bits for the second UE. Each of the modulation symbols may be generated based on a composite constellation where a first constellation for the first UE and a second constellation for the second UE are superposed.

The base station may be configured to perform Gray conversion on the second information bits at the bit level based on the first information bits mapped onto the first layer before the modulation. In addition, the base station may be configured to generate first modulation symbols based on modulating the first information bits, generate second modulation symbols based on modulating the Gray-converted second information bits, and generate a third modulation symbol based on superposing the first and second modulation symbols.

Advantageous Effects

According to the present disclosure, layer mapping can be performed at a bit level before generation of modulation symbols. Therefore, NOMA can be performed on a layer basis to transmit or receive a downlink signal in a wireless communication system supporting NOMA.

It will be appreciated that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
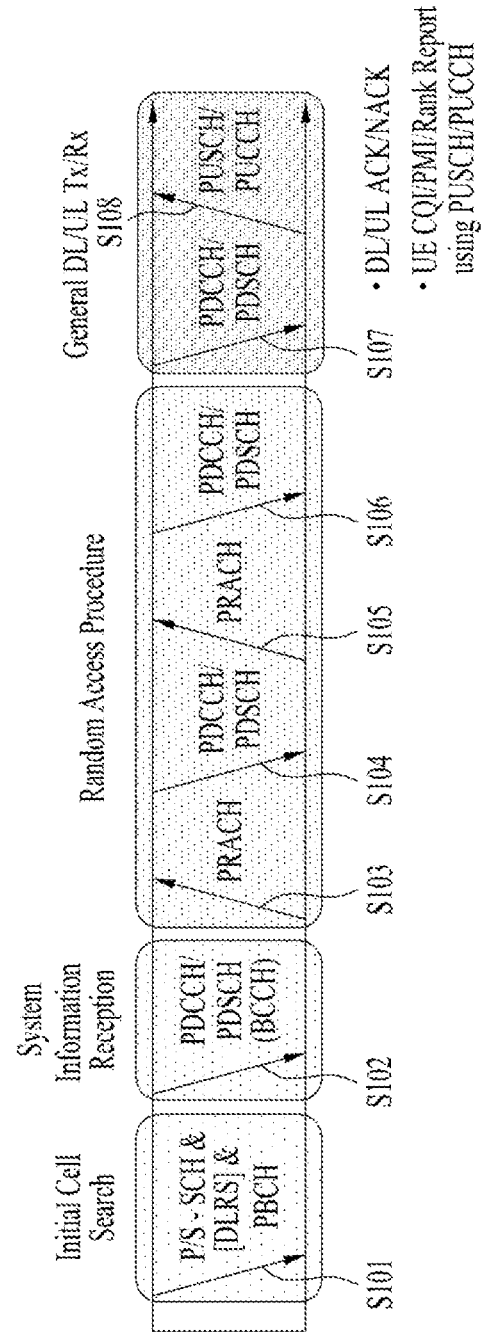
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random-access procedure to complete the access to the eNB [S103 to S106]. To this end, the user equipment may transmit a preamble via a physical random-access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random-access channel and a channel reception [S106] of a physical downlink control channel and a corresponding physical downlink shared channel.

Having performed the above-mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
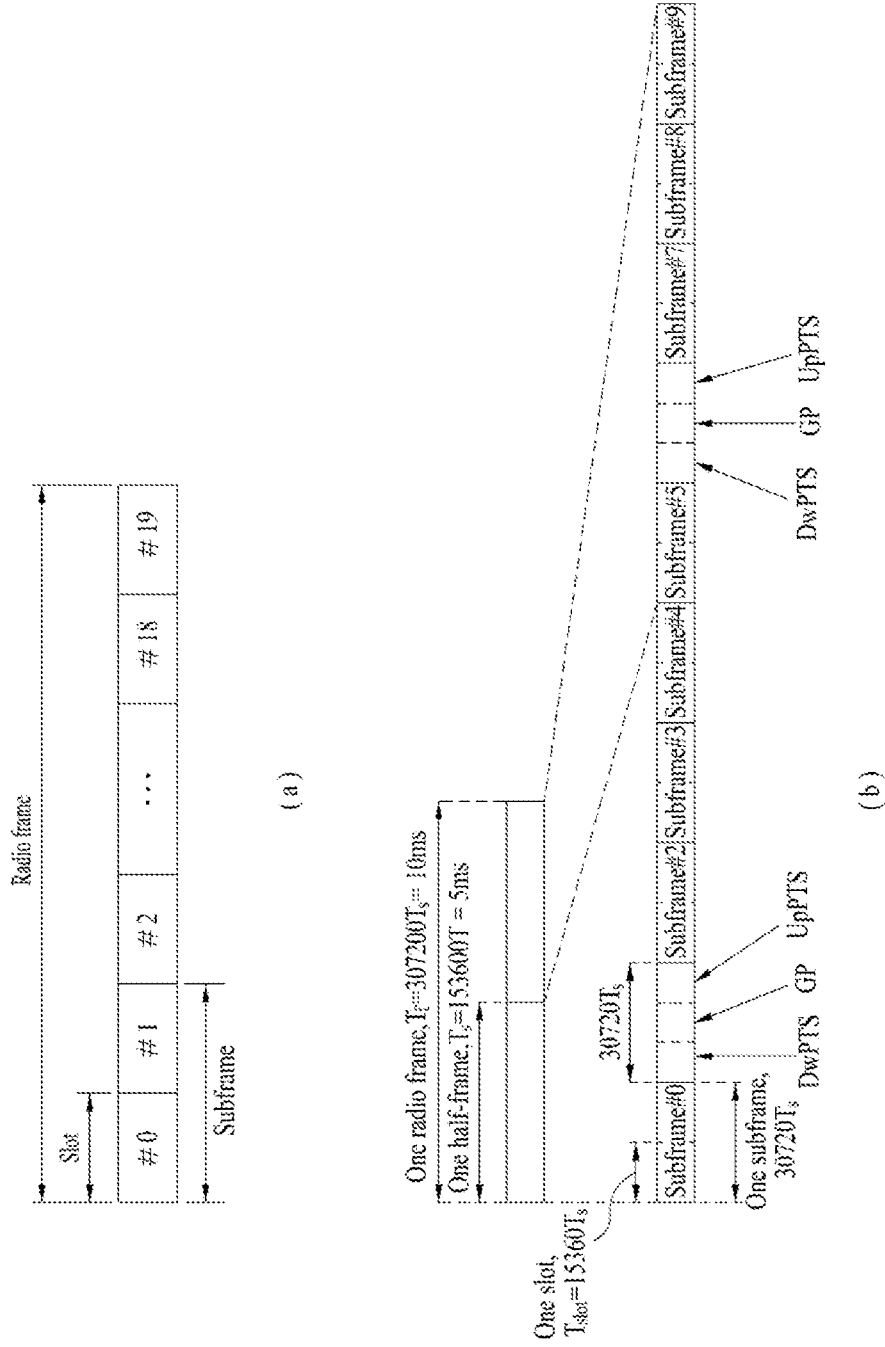
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
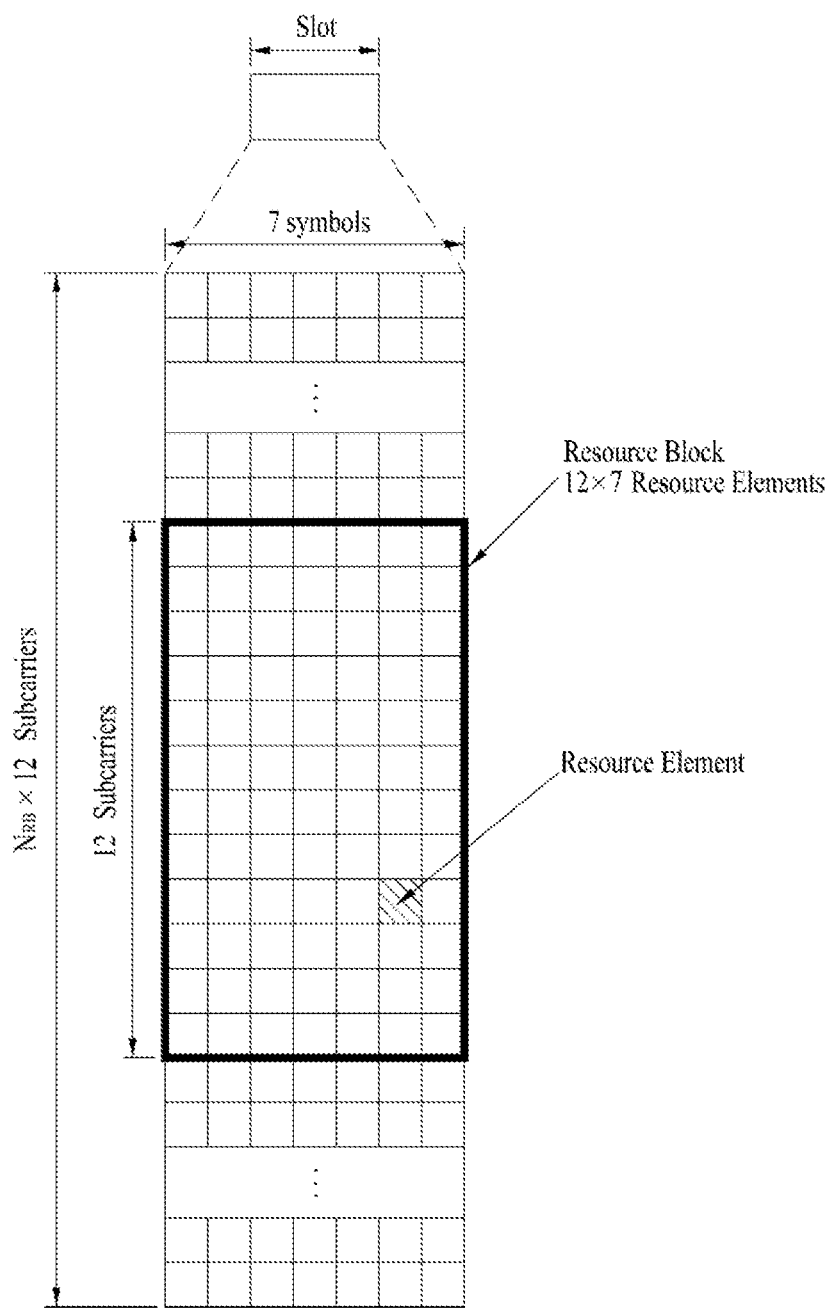
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
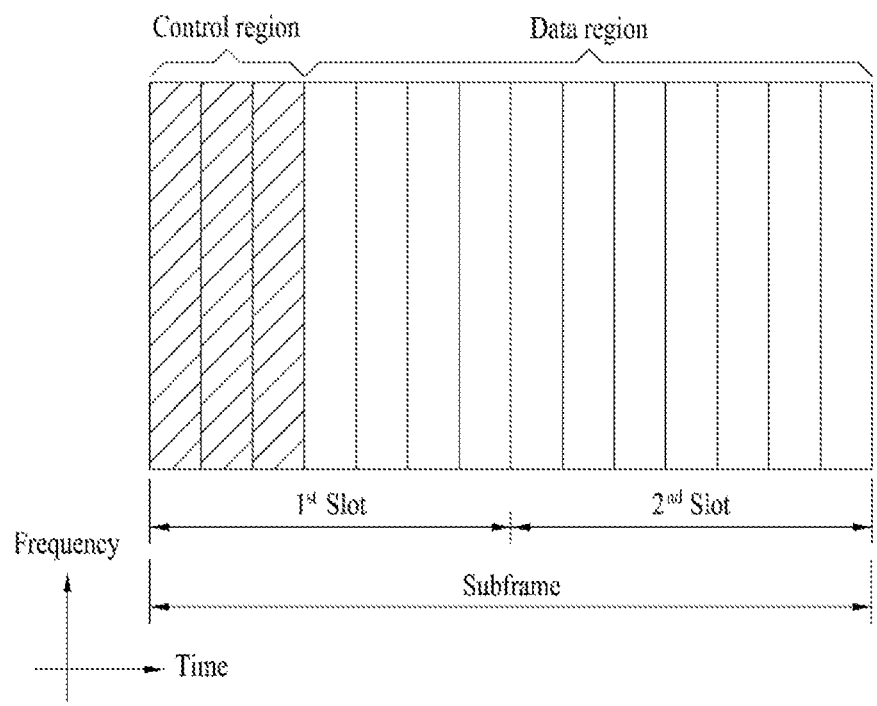
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
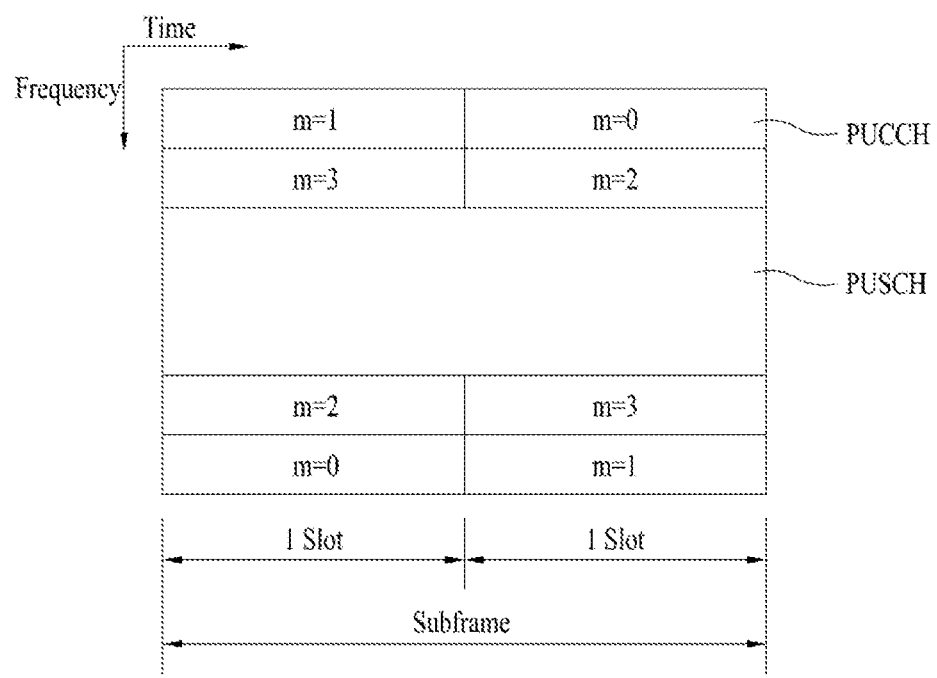
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

Figure 6:
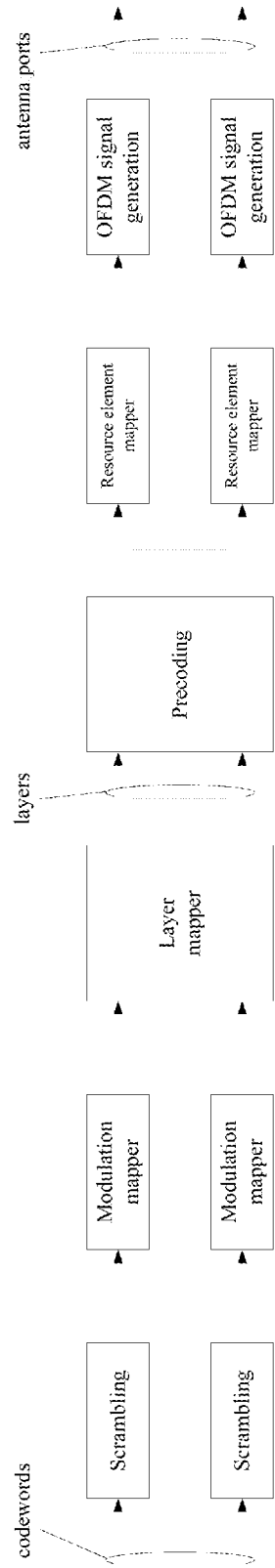
FIG. 6 illustrates downlink physical channel processing in the 3GPP LTE/LTE-A system.

FIG. 6 illustrates downlink channel processing in the LTE system.

Referring to FIG. 6, a bit sequence included in each codeword is scrambled, and then scrambled bit sequence is converted into a modulation symbol by a modulation mapper. Thus, the remaining processing processes (e.g., layer mapping, precoding, resource mapping, etc.) may be performed on a modulation symbol level. Details of the downlink channel processing can be found in 3GPP TS 36.211.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 7:
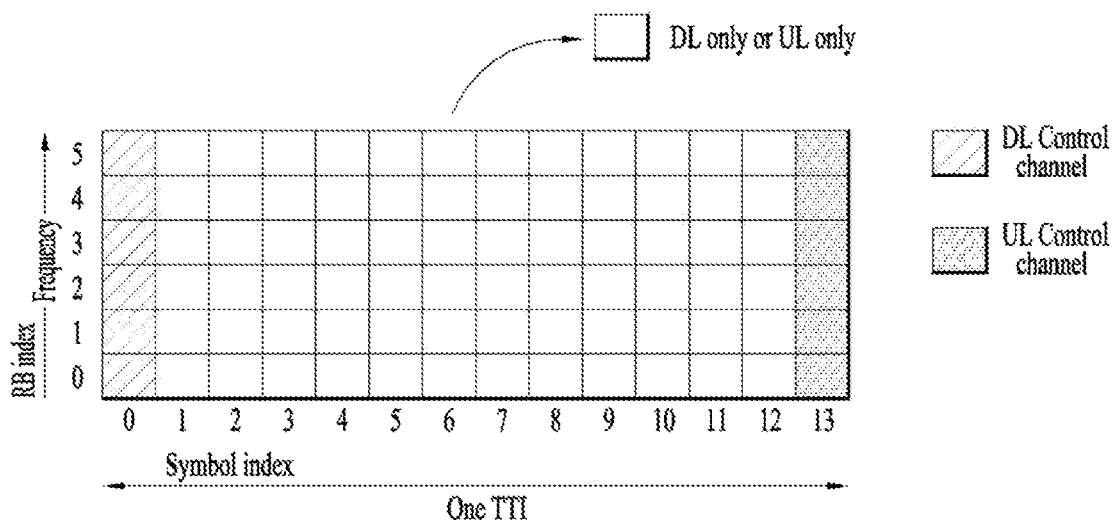
FIG. 7 is a diagram illustrating a structure of a self-contained subframe according to one embodiment of the present invention.

FIG. 7 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 7, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 7 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 8:
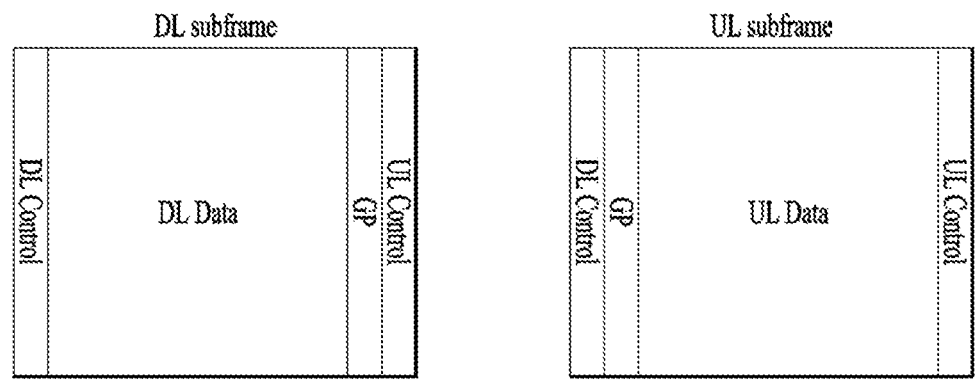
FIG. 8 is a diagram illustrating a downlink self-contained subframe and an uplink self-contained subframe according to one embodiment of the present invention.

FIG. 8 is a diagram illustrating a DL subframe and a UL subframe according to one embodiment of the present invention.

Referring to FIG. 8, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

NOMA

A multiple access scheme can be classified into an Orthogonal Multiple Access (OMA) scheme and a Non-Orthogonal Multiple Access (NOMA) scheme. For example, the OMA may include Frequency Division Multiple Access (FDMA), Time Division Multiple Access (TDMA), Code Division Multiple Access (CDMA), Spatial Division Multiple Access (SDMA)

The conventional wireless communication system has used the OMA scheme. According to the OMA scheme, multiple UEs transmit and receive in a quasi-orthogonal domain or an orthogonal domain. For example, in the FDMA, each UE may use different frequency resources, and in the SDMA, each UE may use different scrambling sequences.

In recent years, the NOMA scheme has been researched to improve the spectral efficiency. For example, the 3GPP standardization group has discussed Multiuser Superposition Transmission (MUST).

Figure 9:
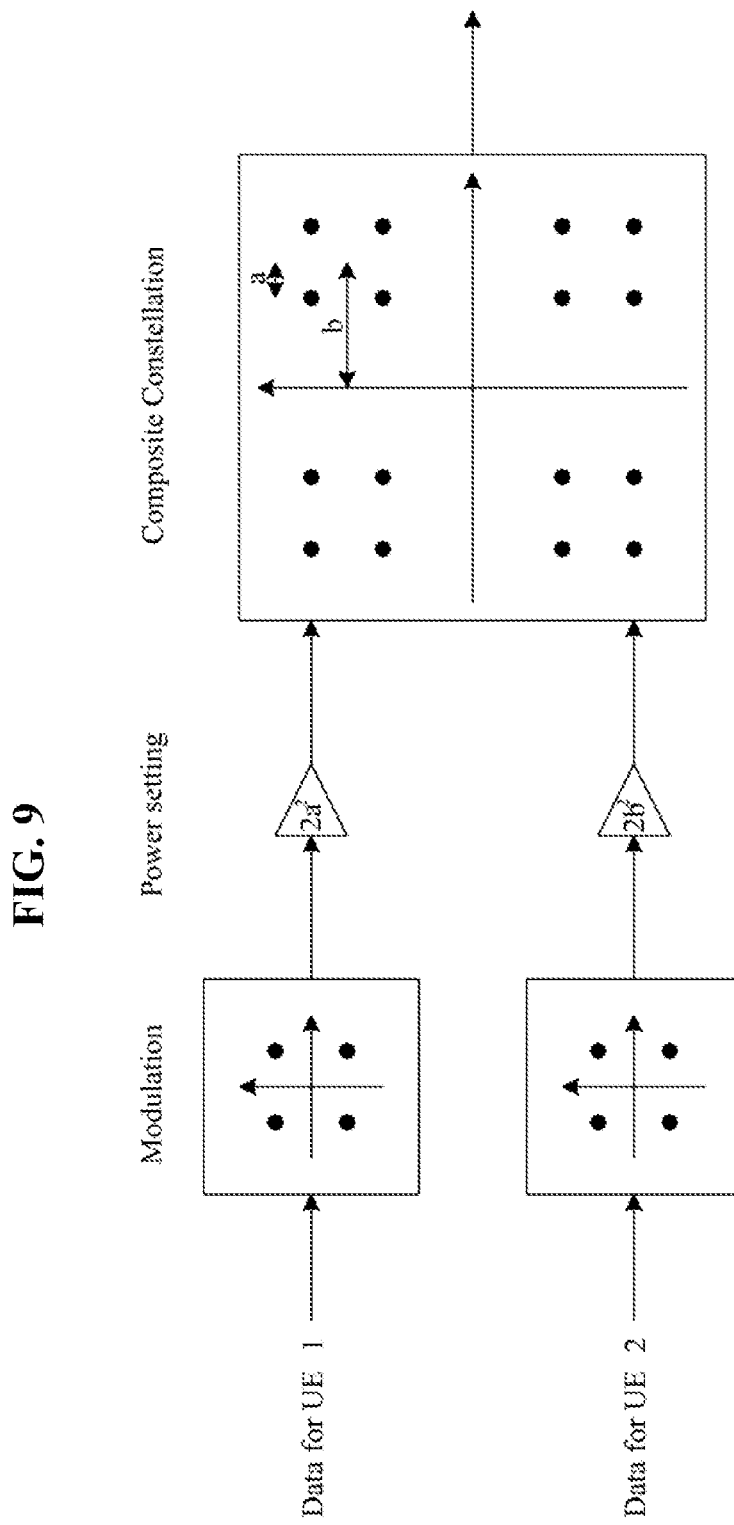
FIG. 9 illustrates an operation for NOMA transmission.

FIG. 9 illustrates an operation for NOMA transmission. For convenience of description, it is assumed that a QPSK modulation scheme is applied to both UE 1 and UE 2.

Referring to FIG. 9, an eNB performs QPSK modulation on an information sequence for each of UE 1 and UE 2. After configuring transmission power for each UE (b>a), the eNB performs transmission by superposing signals for the UEs.

Upon receiving the signals generated as described above with reference to FIG. 9, UE 2 may consider the signal for UE 1 as noise. That is, if the power of the signal for UE 1 is significantly different from that of the signal for UE 2, the signal for UE 1 can be considered as noise. Thus, UE 2 can receive its signal in the same way as in the prior art. However, since the power of the signal for UE 2 is relatively higher than that of the signal for UE 1, UE 1 requires a process for cancelling the signal for UE 2.

To cancel the signal for UE 2, UE 1 may use a Maximum Likelihood (ML) scheme or a Successive Interference Cancellation (SIC) scheme. The ML scheme is a method of estimating, as a transmitted signal, a constellation point closest to a received signal in a composite constellation where constellations of individual UEs are superposed. Meanwhile, according to the SCI scheme, after generation of an interference signal, the interference signal is cancelled from a received signal, and then a desired signal is demodulated.

Figure 10:
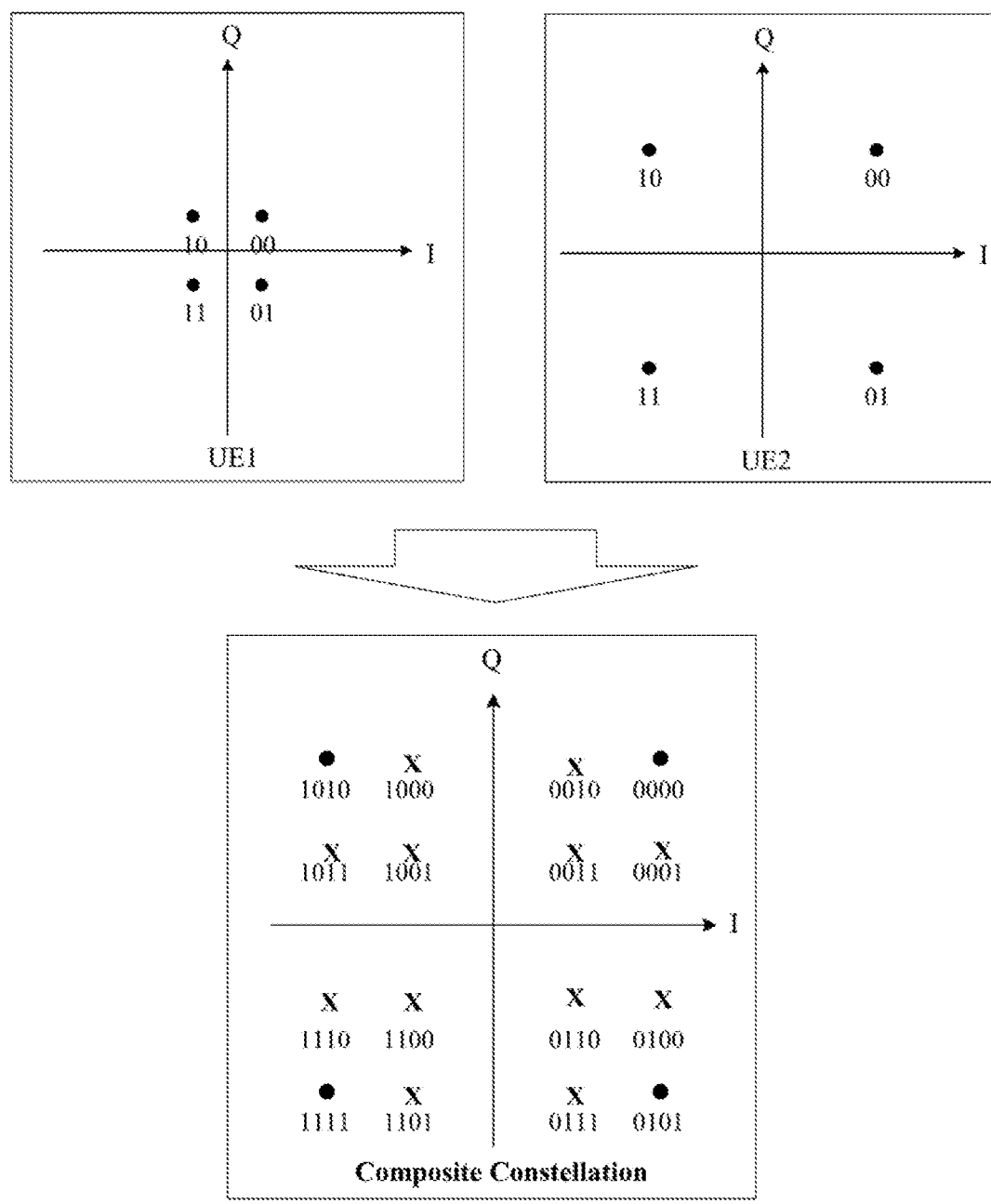
FIGS. 10 and 11 illustrate constellations for NOMA.

FIG. 10 illustrates the locations of final modulation symbols and the bit sequence mapped to each symbol in a composite constellation obtained by superposing two QPSK constellations.

If the NOMA operation is performed by reusing a constellation defined in the current 3GPP specifications, bit sequences of adjacent modulation symbols may have two or more different digits (bits). That is, adjacent constellation points denoted by "X" may have two or more different digits (bits). Here, the adjacent constellation points mean constellation points with the same value of I or Q. For example, the first and third bits of X (1000) is different from those of X (0010). If an adjacent modulation symbol with two different bits is recognized as a received signal, a 50 percent error may occur in the case of QPSK.

To solve this problem, it is proposed in an embodiment of the present disclosure that the number of different bits between bit sequences of adjacent modulation symbols is set to 1. To this end, the Gray mapping can be applied. For example, it is assumed that QPSK is applied to two UEs belonging to a NOMA pair. The bit sequence of each constellation point on a composite constellation is represented as $x_1\ x_2\ x_3\ x_4$ (where $x_1$ is the MSB). In addition, the bit sequence of the QPSK constellation point of a Far UE (FUE) with relatively high DL transmission power is represented as $f_1\ f_2$, and the bit sequence of the QPSK constellation point of a Near UE (NUE) with relatively low DL transmission power is represented as $n_1\ n_2$.

In this case, according to an embodiment of the present disclosure, the bit sequence of each constellation point on the composite constellation can be expressed as shown in Equation 1.

$$x_1 = f_1$$

$$x_2 = f_2$$

$$x_3 = XNOR\ (f_1, n_1)$$

$$x_4 = XNOR\ (f_2, n_2) \quad [\text{Equation 1}]$$

In Equation 1, XNOR (i, j) means a not-exclusive OR operation (the logical compliment of the exclusive OR). According to the XNOR operation, when two bits to be compared are the same, the operation result becomes 1. On the contrary, when two bits are different, the operation result becomes 0. However, the above-described XNOR operation is merely exemplary, and it can be replaced with other operations (e.g., XOR).

Figure 11:
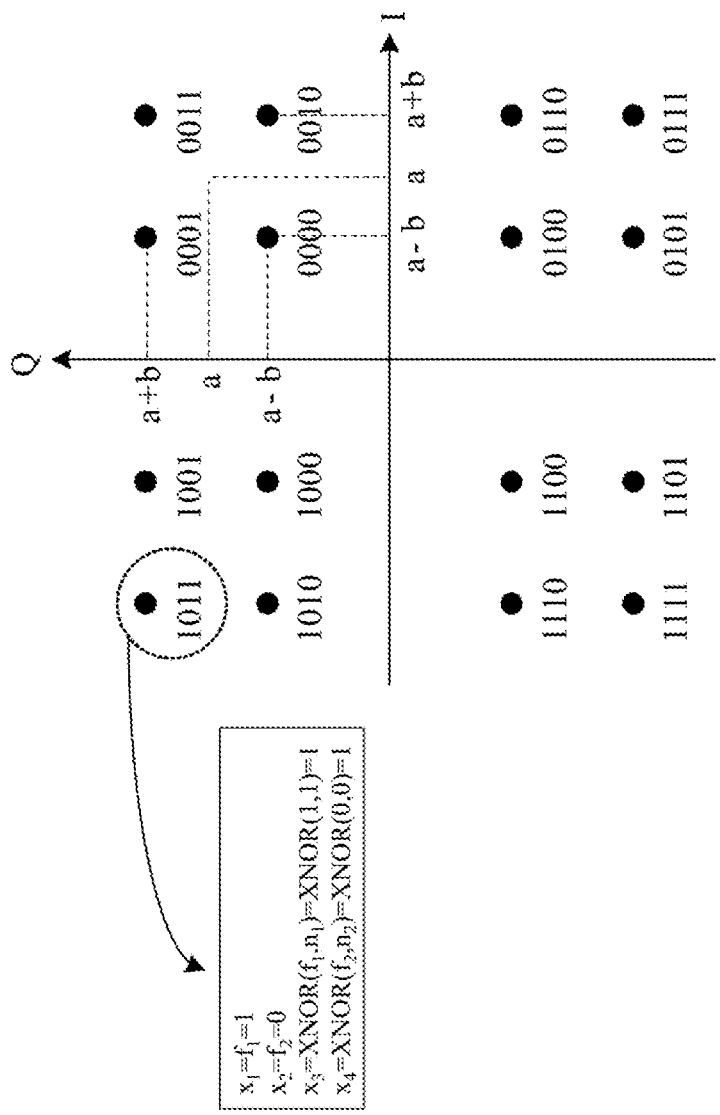

FIG. 11 illustrates a composite constellation according to Equation 1. It is assumed in FIG. 11 that the average power of a FUE is $2b^2$ and the average power of a NUE is $2a^2$, where a<b. For example, constellation point 1011 may be obtained by combining constellation point 10 in the second quadrant of the QPSK constellation of the FUE and constellation point 10 in the second quadrant of the QPSK constellation of the NUE.

As shown in FIG. 11, a difference between bit sequences of adjacent modulation symbols is maintained as 1 bit on the composite constellation configured according to the embodiment of the present disclosure In addition, although the XNOR operation is used in the present embodiment, an exclusive OR (XOR) operation can also be used. That is, any one of the XNOR and XOR operations can be used to maintain a difference between bit sequences of adjacent modulation symbols as 1 bit.

Bit-Level Layer Mapping

According to a NOMA scheme such as MUST, NOMA can be applied to some of multiple layers to be received by a UE. To apply NOMA to some layers, the conventional physical channel processing process illustrated in FIG. 6 needs to be modified. To this end, the present disclosure proposes new bit-level layer mapping for NOMA. In the following, although the present disclosure will be described based on MUST, which is one of the NOMA schemes, the disclosure is not limited thereto. In addition, the following embodiments can be applied when bit sequences for multiple UEs are included in one modulation symbol.

In MUST, an eNB pairs UEs between which the SINR difference is equal to or more than a predetermined level and transmits signals for the paired UEs through superposition. A NUE may cancel a signal for a FUE or apply a reduced ML algorithm by considering the signal for the FUE. The ML algorithm can be applied based on a composite constellation for the NUE and FUE. If the modulation schemes of the NUE and FUE are 16 QAM and QPSK, respectively, the composite constellation may be 64 QAM. A distance between constellation points may be configured non-uniformly depending on the power ratio between the NUE and FUE.

To improve the performance of an ML algorithm, it is desirable that the Gray mapping is applied as bit-sequence-to-symbol mapping on a composite constellation as described above. For example, it is desirable to maintain a difference between bit sequences of adjacent symbols as one digit (bit). The bit-sequence-to-symbol mapping may mean a process in which a bit value indicated by each modulation symbol (I, Q) is mapped to a corresponding modulation symbol. For example, in the case of the simplest BPSK, the bit value of 1 is generally mapped to a modulation symbol of (+1, 0). However, the bit value of 0 may be mapped to the modulation symbol of (+1, 0), and the bit value of 1 may be mapped to a modulation symbol of (−1, 0).

In the current LTE specifications, bit-sequence-to-symbol mapping on a constellation for each modulation order corresponds to the Gray mapping. However, as described above, the features of the Gray mapping cannot be maintained on a composite constellation where the constellations defined in the current LTE specifications are superposed (for example, the composite constellation shown in FIG. 10).

Therefore, a method of maintaining the Gray mapping on a composite constellation is required. To maintain the Gray mapping on a composite constellation, a super-constellation or a bit-level Gray converter can be considered. Here, the super-constellation may mean a composite constellation to which the Gray mapping is applied (for example, the composite constellation shown in FIG. 11).

Alternatively, a constellation used in the legacy LTE system may be reused for the super-constellation. For example, when an eNB intends to transmit one modulation symbol by superposing two bits for a FUE and two bits for a NUE, the eNB may reuse the 16 QAM constellation of the legacy LTE system. The above operation can be generalized as follows. When an eNB intends to transmit one modulation symbol by superposing N bits for a FUE and M bits for a NUE, the eNB may reuse a constellation of the legacy LTE system, which corresponds to a modulation order of $\log_2(M+N)$.

The bit-level Gray converter may change a bit sequence of UE 1 (e.g., NUE) by considering a symbol coordinate or a bit sequence of UE 2 (e.g., FUE). After changing the bit sequence of UE 1, an eNB may generate modulation symbols for the individual UEs in the same way as in the prior art and perform superposition thereon. By doing so, the Gray mapping can be applied.

For example, the bit-level Gray converter may perform an XOR or XNOR of the bit sequences of the NUE and FUE. For example, assuming that two UEs belonging to a NOMA pair use QPSK, the bit sequence of a FUE is $f_1\ f_2$, and the bit sequence of a NUE is $n_1\ n_2$, the bit sequence of the NUE after passing through the bit-level Gray converter, $n_1'\ n_2'$ can be expressed as shown in Equation 2. In this case, the bit sequence of the FUE does not change after passing through the bit-level Gray converter.

$$n_1' = XNOR\ (f_1, n_1)$$

$$n_2' = XNOR\ (f_2, n_2) \quad \text{[Equation 2]}$$

In Equation 2, instead of the XNOR, the XOR can be applied.

After passing the bit sequences through the bit-level Gray converter, the eNB may map the bit sequences of the FUE and NUE using the constellation shown in FIG. 10.

For example, assuming that the bit sequences of the FUE and NUE are 10 and 00, respectively, it can be seen from Equation 2 that the bit sequence of the NUE is converted into 01. Thus, by superposing a modulation symbol for the FUE's bit sequence 10 and a modulation symbol for the NUE's bit sequence 01, the eNB transmits a signal corresponding to X (1001) on the composite constellation of FIG. 10.

In the following, it is assumed that the NUE receives X (1100), which differs from X (1001) in two bits, by failing to receive the signal corresponding to X (1001) correctly. In this case, the NUE performs a process reverse to the bit-level Gray converter by assuming that a part of its bit sequence, 00 is XNORed with a part of the FUE's bit sequence, 11. In other words, since the bit value output when 00 is XNORed with 11 of the FUE is 00, the NUE determines that its bit sequence before the bit-level Gray converter is 00. When the NUE misunderstands X (1001) as X (1100), the NUE can correctly obtain the part of its bit sequence, 00 even though a 50 percent error occurs at the total bit level.

As described above, a composite constellation to which the Gray mapping is applied can be generated based on the bit-level gray converter or the super-constellation. However, if the application of MUST is determined per layer or if a different MUST UE pair is configured for each layer, the conventional physical channel processing of FIG. 6 may not support the corresponding MUST scheme. For example, although FIG. 6 shows that a modulation symbol is generated by a modulation mapper before layer mapping, the Gray mapping using the bit-level Gray converter or super-constellation needs to be performed at a bit level. Thus, according to an embodiment of the present disclosure, layer mapping may be performed before generation of modulation symbols.

In an embodiment of the present disclosure, layer mapping may be performed at a bit level rather than a modulation symbol level, and after the layer mapping, a modulation symbol may be generated by considering the application of MUST to each layer.

Figure 12:
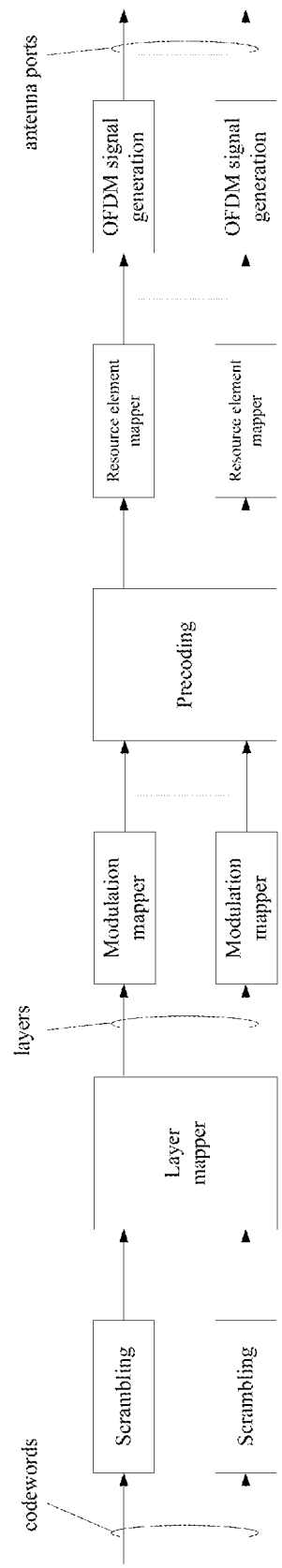
FIGS. 12 to 15 illustrate physical channel processing for NOMA.
Figure 13:
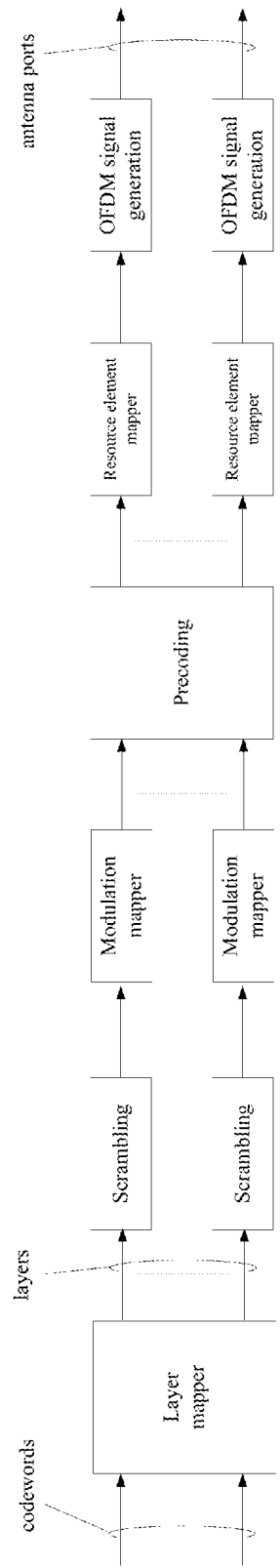

For example, according to an embodiment of the present disclosure, physical channel processing can be performed as shown in FIG. 12 or 13. Specifically, FIG. 12 shows a case in which bit-level layer mapping is performed before scrambling, and FIG. 13 shows a case in which bit-level layer mapping is performed after scrambling.

When the layer mapping is performed before the scrambling as shown in FIG. 12, the scrambling may be defined for each layer. For example, layer-specific scrambling may be performed, and to this end, a layer index may be used as a scrambling initialization parameter.

In the bit-level layer mapping, layers may be distinguished as in symbol-level layer mapping. However, a new layer mapping equation needs to be defined to perform the layer mapping on a bit basis. For example, according to the symbol-level layer mapping, when the modulation symbols of one CW are mapped to two layers, odd-numbered modulation symbols are mapped to layer 0, and even-numbered modulation symbols are mapped to layer 1.

In the bit-level layer mapping, a modulation order needs to be considered for the layer mapping. For example, assuming that the modulation order is 2 (i.e., QPSK) and bits included in a bit sequence are 2n and 2n+1 (where n=0, 1, 2, 3, . . . ), if n is an odd number, the bits of 2n and 2n+1 may be mapped to layer 0. On the contrary, if n is an even number, the bits of 2n and 2n+1 may be mapped to layer 1. In other words, bit indices of 0(=2*0), 1(=2*0+1), 4(=2*2+0), 5(=2*2+1), 8(=2*4+0), 9(=2*4+1), . . . may be mapped to layer 0, and bit indices of 2, 3, 6, 7, 10, 11, . . . may be mapped to layer 1. When the modulation order is 4, if n is an odd number, bits of 4n, 4n+1, 4n+2, and 4n+3 may be mapped to layer 0. On the contrary, if n is an even number, bits of 4n, 4n+1, 4n+2, and 4n+3 may be mapped to layer 1.

Although the above example assumes that the bit sequence of one CW are mapped to two layers for convenience of description, the present disclosure is not limited thereto. That is, the bit sequence of one CW can be mapped to 1, 2, 3, 4, 16, or 32 layers. In addition, the modulation order is not limited to 2 (i.e., QPSK) or 4 (i.e., 16 QAM), and other modulation orders including 8 (i.e., 64 QAM), 16 (i.e., 256 QAM), etc. can also be used.

The above-described bit-level layer mapping can be generalized as follows. When the modulation order is M and when the number of layers to which the bit sequence corresponding to one CW is mapped is L, bits with bit indices of $\{Mn, Mn+1, \ldots, Mn+M-1\}$ may be mapped to n modulo L layers.

When bit-level layer mapping is performed as shown in FIG. 12 or 13, a bit-level Gray converter for MUST may be located before a modulation mapper.

Figure 14:
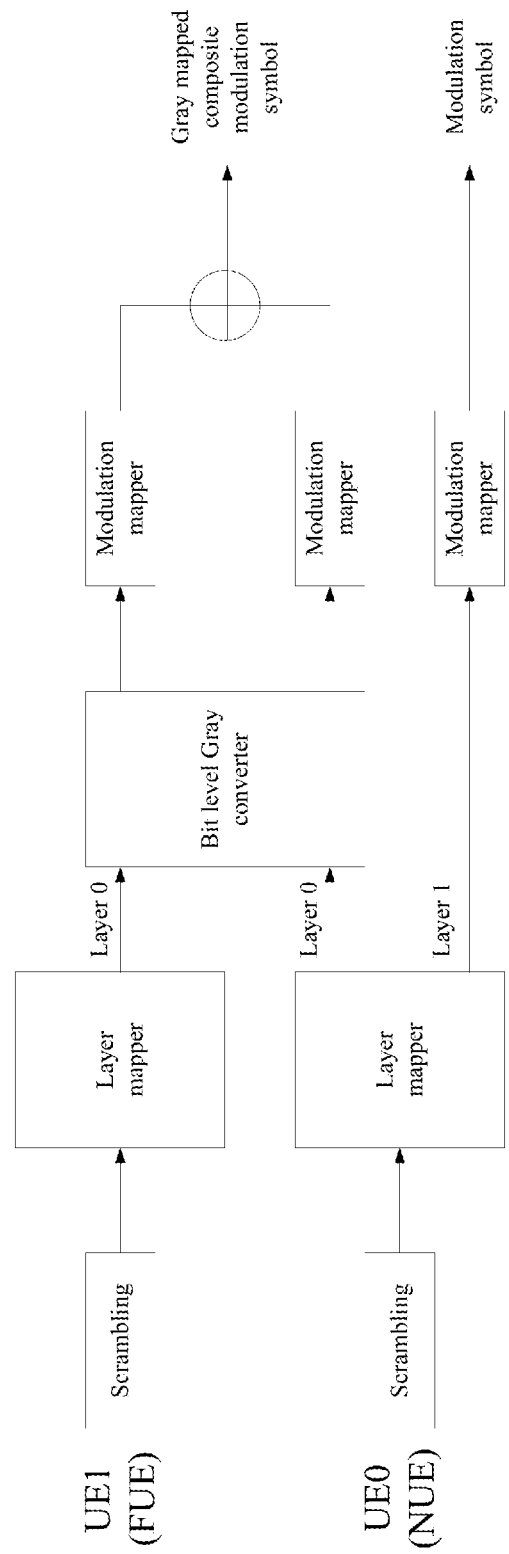
Figure 15:
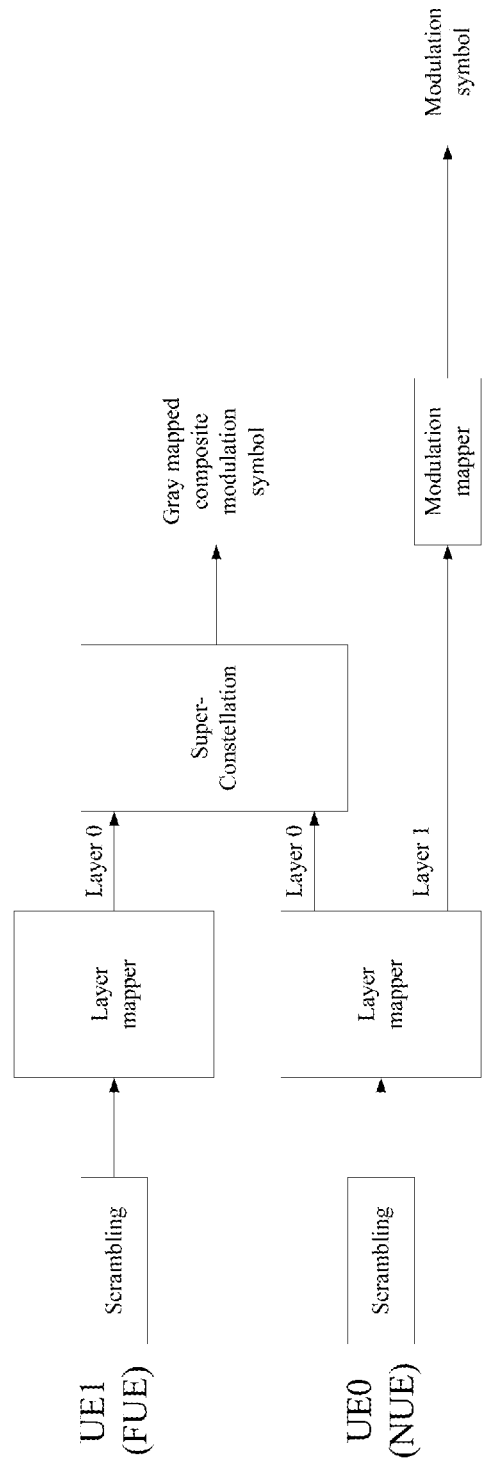

FIGS. 14 and 15 illustrate downlink processing procedures at an eNB when the MUST operation is applied to layer 0 of a NUE and layer 0 of a FUE. Specifically, FIG. 14 shows MUST using a bit-level Gray converter, and FIG. 15 shows MUST using a super-constellation. Each of the layer mappers in FIGS. 14 and 15 corresponds to a bit-level layer mapper.

The proposed bit-level layer mapper can be applied to various physical channels (e.g., control/data/reference signals, etc.) and services, or it may be used only in a specific situation, for example, when multiple access is performed at a bit level as in MUST.

If the bit-level layer mapping is used only in a specific situation, the physical channel processing shown in FIG. 6

(e.g., symbol-level layer mapping) cab be used in a normal situation, and the physical channel processing shown in FIG. 14/15 can be used in the specific situation. In addition, an eNB may inform a UE whether the physical channel processing of FIG. 6 or the physical channel processing of FIG. 14/15 is used through higher layer signaling or DCI.

Figure 16:
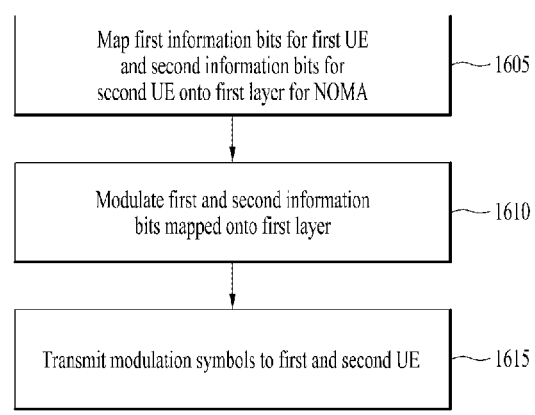
FIG. 16 is a flowchart illustrating a method of transmitting and receiving downlink signals between an eNB and UEs.

FIG. 16 illustrates a method of transmitting and receiving downlink signals between an eNB and UEs. Redundant description will be omitted.

Referring to FIG. 16, the eNB maps first information bits for a first UE and second information bits for a second UE onto a first layer for NOMA [1605].

The eNB modulates the first and second information bits mapped onto the first layer [1610].

The eNB transmits modulation symbols, which are generated by the modulation, to the first and second UEs [S1615].

Before generating the modulation symbols, the eNB may map the first and second information bits onto the first layer at a bit level.

For example, the eNB may map third information bits for the first UE onto a second layer, and in this case, the second layer may be for NOMA of the first UE and a third UE rather than the second UE or OMA.

In addition, the eNB may determine the first information bits to be mapped onto the first layer and the third information bits to be mapped onto the second layer from a bit sequence for the first UE by considering a modulation order.

A part of a bit sequence indicated by each modulation symbol may correspond to the first information bits for the first UE, and the remaining part thereof may correspond to the second information bits for the second UE. For example, each modulation symbol may be generated based on a composite constellation where a first constellation for the first UE and a second constellation for the second UE are superposed.

Before the modulation, the eNB may perform Gray conversion on the second information bits at the bit level based on the first information bits mapped onto the first layer. The eNB may generate first modulation symbols by modulating the first information bits, generate second modulation symbols by modulating the Gray-converted second information bits, and generate a third modulation symbol by superposing the first and second modulation symbols.

Although the present disclosure is described based on downlink signal transmission and reception based on NOMA, the disclosure is not limited thereto. That is, the embodiments of the present disclosure can also be applied to uplink signal transmission and reception.

Figure 17:
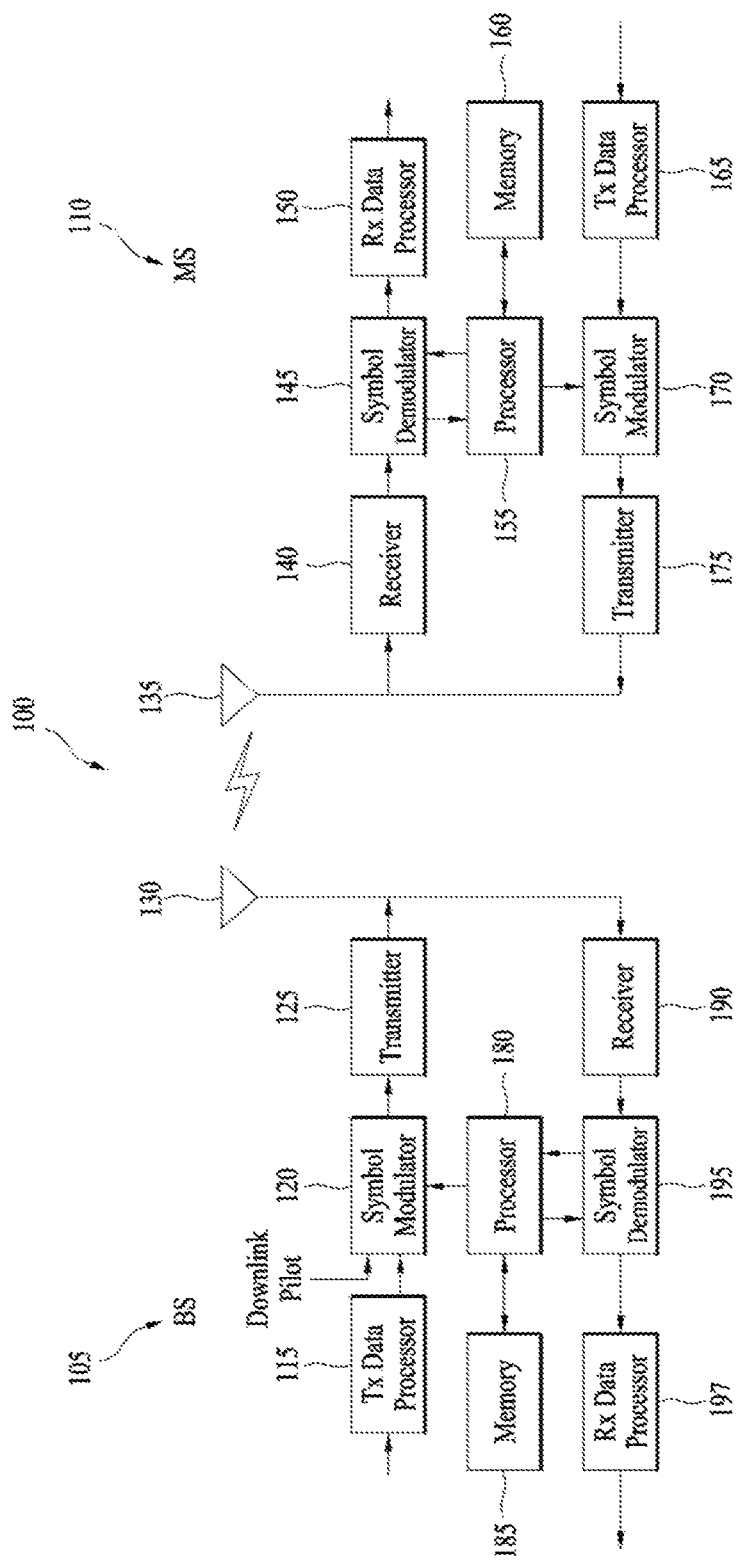
FIG. 17 is a block diagram illustrating a base station and a user equipment according to an embodiment of the present disclosure.

FIG. 17 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

A base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150.

Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method of transmitting a signal to multiple User Equipments (UEs) based on Non-Orthogonal Multiple Access (NOMA) by a base station in a wireless communication system, the method comprising:
   mapping first information bits for a first UE and second information bits for a second UE onto a first layer for NOMA and third information bits for the first UE onto a second layer, wherein the first information bits and the third information bits are included in a first bit sequence, and the second information bits are included in a second bit sequence;
   modulating the first and second information bits mapped onto the first layer and the third information bits mapped on the second layer; and
   transmitting modulation symbols generated based on the modulation to the first and second UEs,
   wherein the base station is configured to map the first and second information bits onto the first layer and the third information bits onto the second layer at a bit level, before generating the modulation symbols, based on whether bit indices of the first information bits and the third information bits in the first bit sequence and a bit index of the second information bits in the second bit sequence are even or odd.

2. The method of claim 1,
   wherein the second layer is for NOMA between the first UE and a third UE rather than the second UE or Orthogonal Multiple Access (OMA).

3. The method of claim 1, further comprising determining the first information bits to be mapped onto the first layer and the third information bits to be mapped onto the second layer from a bit sequence for the first UE based on considering a modulation order.

4. The method of claim 1, wherein each of the modulation symbols is generated based on a composite constellation where a first constellation for the first UE and a second constellation for the second UE are superposed.

5. The method of claim 1, further comprising, performing Gray conversion on the second information bits at the bit level based on the first information bits mapped onto the first layer before the modulation.

6. The method of claim 5, wherein modulating the first and second information bits further comprises:
   generating first modulation symbols based on modulating the first information bits;
   generating second modulation symbols based on modulating the Gray-converted second information bits; and
   generating a third modulation symbol based on superposing the first and second modulation symbols.

7. A base station configured to transmit a signal to multiple User Equipments (UEs) based on Non-Orthogonal Multiple Access (NOMA) in a wireless communication system, the base station comprising:
a transmitter; and
a processor configured to:
map first information bits for a first UE and second information bits for a second UE onto a first layer for NOMA and third information bits for the first UE onto a second layer, wherein the first information bits and the third information bits are included in a first bit sequence, and the second information bits are included in a second bit sequence, and
modulate the first and second information bits mapped onto the first layer and the third information bits mapped on the second layer; and
transmit, through the transmitter, modulation symbols generated based on the modulation to the first and second UEs,
wherein the processor is configured to map the first and second information bits onto the first layer and the third information bits onto the second layer at a bit level, before generating the modulation symbols, based on whether bit indices of the first information bits and the third information bits in the first bit sequence and a bit index of the second information bits in the second bit sequence are even or odd.

8. The base station of claim 7,
wherein the second layer is for NOMA between the first UE and a third UE rather than the second UE or Orthogonal Multiple Access (OMA).

9. The base station of claim 7, wherein the processor is configured to determine the first information bits to be mapped onto the first layer and the third information bits to be mapped onto the second layer from a bit sequence for the first UE based on considering a modulation order.

10. The base station of claim 7, wherein each of the modulation symbols is generated based on a composite constellation where a first constellation for the first UE and a second constellation for the second UE are superposed.

11. The base station of claim 7, wherein the processor is configured to perform Gray conversion on the second information bits at the bit level based on the first information bits mapped onto the first layer before the modulation.

12. The base station of claim 11, wherein the processor is configured to generate first modulation symbols based on modulating the first information bits, generate second modulation symbols based on modulating the Gray-converted second information bits, and generate a third modulation symbol based on superposing the first and second modulation symbols.

* * * * *